July 15, 1969     F. L. BUCHER     3,455,447
SELF-LEVELING APPARATUS FOR POTATO HARVESTER APRONS
Filed Sept. 27, 1967     3 Sheets-Sheet 1
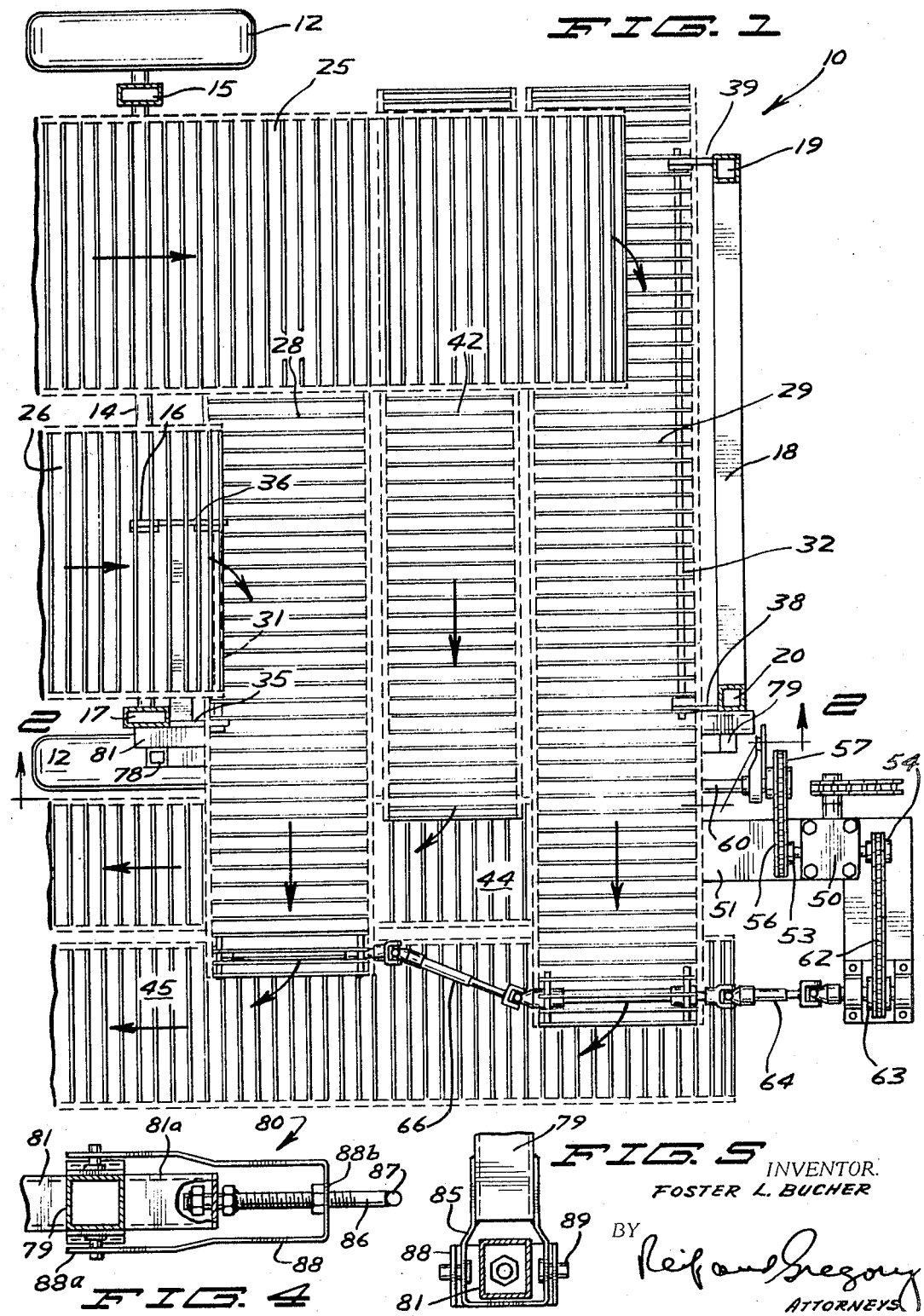
INVENTOR.
FOSTER L. BUCHER
BY
ATTORNEYS

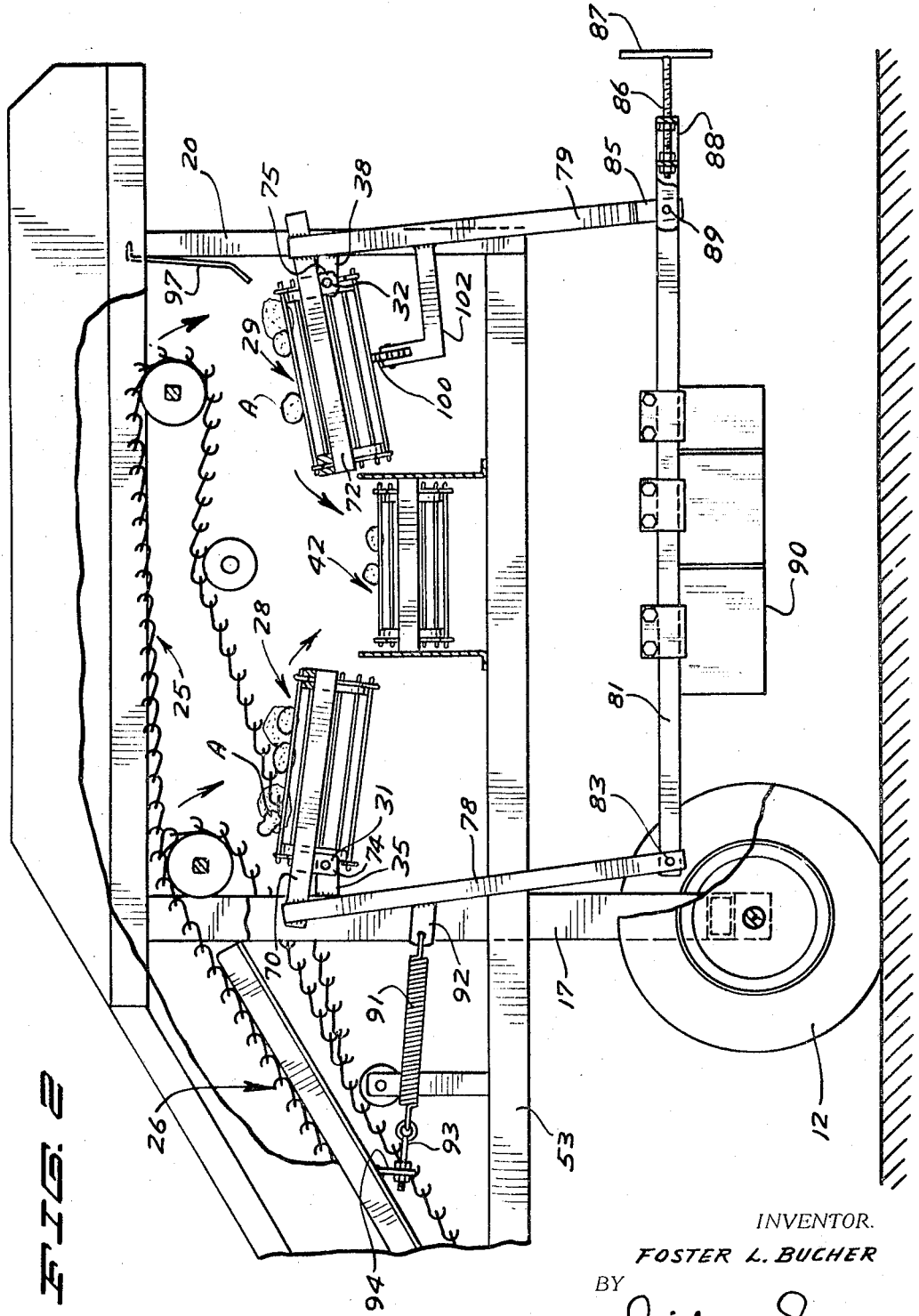

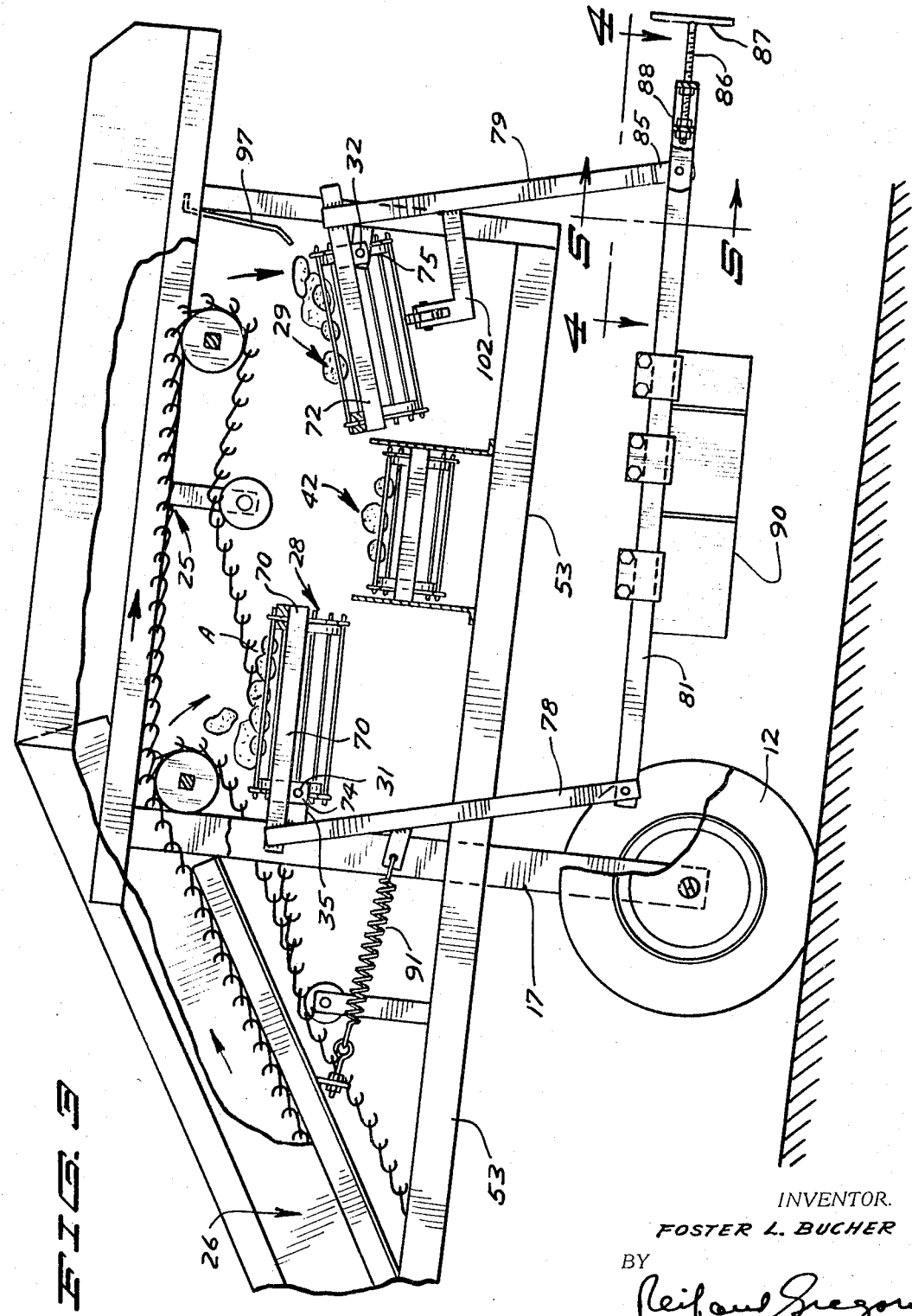

United States Patent Office 3,455,447
Patented July 15, 1969

3,455,447
SELF-LEVELING APPARATUS FOR POTATO HARVESTER APRONS
Foster L. Bucher, Cambridge, Minn., assignor to Braco Inc., Braham, Minn., a corporation of Minnesota
Filed Sept. 27, 1967, Ser. No. 671,003
Int. Cl. B07c 9/00; B07b 13/10; B65g 21/00
U.S. Cl. 209—114                5 Claims

ABSTRACT OF THE DISCLOSURE

A device in connection with a potato harvester for automatically maintaining each of a pair of laterally spaced pivotally supported transverse separating aprons at a certain lateral angular position with respect to the horizontal. An arm depends from each of said aprons having said aprons rigidly secured thereto. A cross bar pivotally connects the lower end portions of said arms and carries a sufficient weight to maintain said aprons in their given angular positions by maintaining a position at the point of the center of gravity of said aprons.

BACKGROUND AND SUMMARY OF THE INVENTION

The invention herein relates to means for maintaining a pair of separating aprons of a potato harvester constant at a certain predetermined lateral angle or tilt with respect to the horizontal by compensating for upward or downward movement of the harvester.

Representative of the reference material developed are U.S. Letters Patent Nos. 2,679,539, 2,468,639, 2,015,549, 2,013,409, 2,591,194 and 2,698,506. The Patent 2,591,194 discloses a longitudinally inclined conveyor for separating articles by means of their shape, but adjustment means must be manned to control the degree of tilt. The remaining references also illustrate inclined conveyors for separation but do not include means for maintaining a constant angle of tilt of the conveyor with respect to the horizontal.

In harvesting potatoes, clods of dirt and stones are picked up by the diggers along with the crop of potatoes. Various means are used to separate the potatoes from the other material and among these are laterally angled or tilted separating aprons. The tilt will be sufficient to cause potatoes to roll off of the conveyor onto another conveyor but the stones and clods of dirt on the apron due to irregular shape and greater weight are unlikely to roll and are carried to the discharge end of the apron for disposal.

Potato fields are not always level and it is not uncommon for the harvesting machine to have upward and downward travel. A grade of three to five percent will affect the operation of the separating apron and manual adjustment becomes necessary.

The invention herein provides means which automatically compensates for the change in grade of a field by maintaining constant the angle of lateral tilt of each of the separating apron or aprons with respect to the horizontal.

It is an object of this invention therefore with respect to a potato harvester to provide means in connection with a transverse apron having a predetermined lateral angular position to automatically compensate for upward and downward travel of the vehicle to maintain said angular position constant with respect to the horizontal.

It is another object of this invention in connection with a potato harvester embodying a pair of spaced transversely tilting separating aprons to provide means for maintaining constant the respective angles of tilt of said aprons with respect to the horizontal notwithstanding the upward and downward travel of the vehicle.

It is more specifically an object of this invention to provide in a potato harvester, a pair of laterally spaced pivotally mounted separating aprons each having a different angle of tilt with respect to a conveyor therebetween, an arm rigid with each of said aprons depending therefrom, a rigid member pivotally connecting said arms, means comprising weights carried by said rigid member, said means, responsive to gravity, compensating for the upward and downward travel of the vehicle by maintaining said aprons constant at their respective angles of tilt.

These and other objects and advantages of the invention will be set forth in the following description made in connection with the accompanying drawings in which like reference characters refer to similar parts throughout the several views and in which:

FIG. 1 is a broken top plan view showing a conveyor portion of a potato harvester;

FIG. 2 is a broken view in elevation taken on line 2—2 of FIG. 1 as indicated, with portions thereof broken away, and showing the essential structure comprising the invention herein;

FIG. 3 is a view similar to FIG. 2 showing the same in a somewhat different operating position;

FIG. 4 is a broken view partially in section taken on line 4—4 of FIG. 2 as indicated; and FIG. 5 is a broken view partially in section and taken on line 5—5 of FIG. 2 as indicated.

DESCRIPTION OF A PREFERRED EMBODIMENT

Referring to the drawings, a potato harvester generally is indicated by the reference numeral 10. What is indicated here is a pull type two wheeled harvester and only so much thereof is shown and only as much description is given as is necessary to support the structure comprising the invention. Other than the structure of the invention, the harvester is of conventional design and its general construction will be readily understood by one skilled in the art.

Supporting said harvester 12 are a pair of spaced wheels 12 journaled onto a frame member 14 extending therebetween. Upstanding from said frame member 12 are frame members 15, 16 and 17. Spaced from said member 12 across the rear of said harvester is a suitably supported frame member 18 having upstanding members 19 and 20.

Said harvester comprises laterally spaced longitudinally extending conveyors 25 and 26 which receive and elevate the crop dug by diggers not here shown and along with the crop of potatoes receive stones and clods of dirt which are dug up along with the potatoes.

The conveyor 25 extends rearwardly further than the conveyor 26. Disposed below said conveyors 25 and 26 transversely thereof and partially underlying the respective discharge end portions thereof are conveyors 28 and 29, which conveyors are hereafter referred to as separating aprons. Said aprons are parallel and laterally spaced with respect to one another being supported along their remote sides by relatively long hinge rods 31 and 32 for lateral pivotal movement. Said rods are journaled in and carried by spaced pairs of projecting arms 35-36 and 38-39 respectively projecting from said upstanding frame members 16-17 and 19-20.

Said aprons are conventional endless conveyors comprising link type belts passing over sprockets of which sprockets a pair will be driven with respect to each apron. The aprons will have a unitary rigid frame construction comprising side wall plate members secured together by transverse members whereby the side plate members carry the sprockets and their respective shafts. This is known construction in the art, the detail of which is not here shown but is merely indicated.

To briefly indicate the remaining related conveyors, a conveyor 42 is carried between said aprons 28 and 29 spaced somewhat therebelow and extending therebetween.

Underlying the discharge end of said conveyor 42 is a longitudinal conveyor 44. Underlying the discharge ends of said aprons 28 and 29 is a longitudinal conveyor 45. The conveyors run in the directions indicated by the arrows thereon as shown in the drawings.

A gear box 50 is shown supported on a frame member 51 having sprockets 53 and 54 carried at either side thereof. A chain 56 passes over the sprocket 53 and over a sprocket 57 carried on a shaft 60 driving the conveyor 42. A chain 62 passes over the sprocket 54 and a sprocket 63 by linkage 64 driving the conveyor 29 and by the linkage 66 driving the conveyor 28. The power or driving means used is conventional and is not here shown.

As will hereinafter be further described, the aprons 28 and 29 respectively receive the material discharged from the conveyors 25 and 26.

With particular reference now to FIG. 2, the aprons 28 and 29 are shown in end view in their respective operating positions. Apron 28 has a transverse supporting and operating frame member 70 forming a cross arm and the apron 29 has a like member 72. Said aprons respectively have suitable pairs of depending arms 74 and 75 through which said hinge rods pass and in turn said rods are carried by the projecting arms 35, 36 and 38, 39 as described.

Rigid with said cross arm 70 is a depending arm 78 and rigid with said cross arm 72 is a depending arm 79. Pivotally connecting the lower end portions of said depending arms is a tubular connecting member 81. Said member 81 may be conventionally pivoted to said arm 78 as by a bolt 83. The arm 79 has depending from its lower end portion a U-shaped bracket 85. Adjusting means 80 as hereafter described connects the member 81 with the depending arm 79. The adjacent end portion 81a of the connecting member 81 passes through said bracket 85 and has a closed end apertured to receive a nutted adjusting screw 86 which has at its free end a hand crank 87. A horizontal elongated U-shaped bracket 88 has its free ends 88a engage the outer sides of the end of the bracket 85 to be pivoted thereto by pivots 89. Said screw 86 is threaded through the enclosed end portion 88b of said bracket 88 whereby turning said screw will move said member longitudinally with respect to the arm 79 and will adjust the spacing between said depending arms 78 and 79. Carried on said connecting or cross bar 81 are balancing members 90 comprising weights.

The particular lateral angular relationships between the depending arms 78 and 79 and their respective cross arms 70 and 72 is a matter of choice or design. What is significant however is the lateral angular position or tilt of each of the aprons 28 and 29 to a horizontal plane or to the horizontal.

The apron 28 receives the material discharged from the conveyor 26. The material A includes potatoes, stones and clods of dirt. The apron will be laterally angled or tilted with respect to the horizontal sufficiently to have potatoes roll off of the apron and onto the conveyor 42. At a tilt at which potatoes will roll off of the apron, stones and clods of dirt because of their greater weight and irregular shape tend to remain on the apron and are discharged from the end of the apron onto the trash conveyor 45. It has been found that an angle on the order of four degrees to the horizontal is a very suitable angular position for said apron 28.

The apron 29 receives the material discharged from the conveyor 25. Here the direction of movement of the potatoes to be separated from said material must be reversed to be deposited onto the conveyor 42. Hence here the angle of tilt of said apron 29 must be greater than that of apron 28. Here it has been found that a suitable angle of tilt is on the order of eight or nine degrees to the horizontal. Stones and clods of dirt are discharged from the end of the conveyor 29 onto the conveyor 45.

Hence taking into consideration the angular relationship of the depending arms 28 and 29 with respect to the cross arms 70 and 72, the lower ends of the depending arms 78 and 79 will be spaced apart to result in the desired lateral tilt or angular relationship of each of said aprons with respect to the horizontal. It will be appreciated that the angular relationship between the arms 78 and the cross arm 70 will be different from that between the arm 79 and the cross arm 72 to arrive at a different degree of tilt for each apron with respect to the horizontal.

It is seen from FIG. 1, that the apron 29 is longer than the apron 28 and is therefore heavier. To offset the difference in weight between said aprons, a counter-balance spring 91 is provided having one end secured to a stud 92 projecting from the arm 78 and having its other end in connection with an adjusting screw 93 secured to a bracket or stud 94 shown secured to a frame portion of the conveyor 26.

A deflection plate 97 is carried by the upright members 19 and 20 with respect to the apron 29.

An idler roller 100 supporting the lower run of the apron 29 is shown carried by an angled bracket 102 extending from the arm 79. The lower run of the apron 28 will also be supported in like manner.

The cross arms 70 and 72 and their respective depending arms 78 and 79 are shown having a fixed relation as by welding but it is to be understood that these may be adjustably secured.

OPERATION

In describing the operation of the invention herein, reference is had to both FIGS. 2 and 3. In FIG. 2, the harvester is on level ground and the transverse aprons 28 and 29 are in a preferred operating position with respect to their lateral tilt to the horizontal. In FIG. 3, the harvester is indicated as traveling on an up grade, such as on the order of one to five percent. Admittedly the invention operates within certain limits of grade not exceeding five to seven percent. A grade as much as seven percent provides difficulty for the operation of the harvester. Hence the limits within which the invention will operate are practical limits.

The purpose of the invention is to maintain constant the lateral angle of tilt of the aprons 28 and 29 with respect to the horizontal. The aprons 28 and 29 as shown in FIG. 3 have the same relation to the horizontal as shown in FIG. 2. With the harvester as a whole angled upwardly in correspondence with the grade, the balance or weight member 90 will maintain a position at the center of gravity with respect to the two aprons. But for this compensation with respect to grade, the upward travel of the harvester would increase the angle of tilt of the leading apron 28 and decrease the angle of tilt of the rearward apron 29 with respect to the horizontal and would thus negative or offset the operative effect of the aprons. A downward travel of the harvester would have an opposite effect with respect to said aprons.

The aprons, the depending arms and the cross or connecting bar carrying the balancing weight act integrally as a pendulum with the balancing weight maintaining a position at the center of gravity. Thus there is maintained a constant relationship of the aprons to the horizontal with automatic compensation being made for upward or downward travel of the harvester.

The relative angle of tilt between the aprons 28 and 29 is readily adjusted by operation of the adjusting means 80.

Thus it is seen that a simple and effective automatically operable apparatus is provided to maintain the separating aprons of a potato harvester at a constant angle of tilt with respect to the horizontal.

What is claimed is:

1. An automatically self-leveling apparatus in connection with a potato harvester for separating potatoes from stones and clods of dirt, having in combination, a framework, a pair of transverse laterally spaced aprons, means carried by said framework pivotally supporting said aprons for lateral pivotal movement thereof, an arm rigid with each of said aprons and depending therefrom, said aprons being angularly positioned laterally with respect to their respective depending arms to each have a predetermined lateral angular position with respect to the horizontal, a cross member pivotally securing the lower portions of said arms in spaced relation, and a balancing member carried by said cross member being positioned and having sufficient weight to maintian a position at the point of the center of gravity with respect to said aprons to maintain said aprons in their respective angular positions with regard to the horizontal compensating for upward or downward travel of said harvester.

2. The structure set forth in claim 1, including means in connection with said aprons arranged and constructed to offset weight difference therebetween.

3. The structure set forth in claim 1, including means in connection with said cross member longitudinally adjusting the extent of said cross member between the depending portions of said arms for adjustment of the angular positions of said aprons with respect to the horizontal, 4. An automatically self-leveling apparatus in connection with a potato harvester for separating potatoes from stones and clods of dirt, having in combination, a framework, a pair of transverse laterally spaced aprons, means carried by said framework pivotally supporting said aprons for lateral pivotal movement thereof, means rigid with each of said aprons having said aprons respectively angularly disposed thereto to each have a predetermined lateral angular position with respect to the horizontal, means pivotally securing said last mentioned means in spaced relation, and means carried by said last mentioned means arranged and constructed to maintain a position at the point of the center of gravity with respect to said aprons to maintain said aprons in their respective predetermined angular positions with regard to the horizontal compensating for upward or downward travel of said harvester.

5. An automatically self-leveling apparatus in connection with a potato harvester for separating potatoes from stones and clods of dirt, having in combination, a framework, a transverse separating apron, means carried by said framework pivotally supporting said apron for lateral pivotal movement thereof, means depending from said apron rigid therewith, said apron being angularly positioned with respect to said means to have a predetermined lateral angular position with respect to the horizontal, and means pivotally connected to said last mentioned means comprising sufficient weight to maintain a position at the point of center of gravity with respect to said apron and said second mentioned means to maintain said apron at its predetermined angular position with respect to the horizontal compensating for upward and downward movement of said harvester.

References Cited

UNITED STATES PATENTS

| | | | |
|---|---|---|---|
| 1,094,621 | 4/1914 | Ayres | 209—117 |
| 2,013,409 | 9/1935 | Hostetter | 171—18 X |

M. HENSON WOOD, Jr., Primary Examiner

R. A. SCHACHER, Assistant Examiner

U.S. Cl. X.R.

171—18; 198—126; 209—117